United States Patent [19]
Gilbert

[11] Patent Number: 5,850,396
[45] Date of Patent: Dec. 15, 1998

[54] MULTICAST MESSAGE DISTRIBUTION IN A POLYNOMIAL EXPANSION MANNER

[75] Inventor: Timothy G. Gilbert, Vermillion, S. Dak.

[73] Assignee: Gateway 2000, Inc., North Sioux City, S. Dak.

[21] Appl. No.: 669,209

[22] Filed: Jun. 24, 1996

[51] Int. Cl.[6] .................................................. H04L 12/18
[52] U.S. Cl. ........................ 370/390; 370/408; 370/432
[58] Field of Search .................... 370/389, 390, 370/396, 400, 408, 420, 432; 395/200.15; 340/825.54

[56] References Cited

U.S. PATENT DOCUMENTS

| | | | |
|---|---|---|---|
| 4,818,984 | 4/1989 | Cang et al. | 340/825.54 |
| 4,864,559 | 9/1989 | Perlman | 370/60 |
| 5,048,081 | 9/1991 | Gavaras et al. | 379/221 |
| 5,079,767 | 1/1992 | Perlman | 370/94.3 |
| 5,245,607 | 9/1993 | Caram | 370/94.1 |
| 5,297,143 | 3/1994 | Fridrich et al. | 370/85.3 |
| 5,317,568 | 5/1994 | Bixby et al. | 370/85.6 |
| 5,361,256 | 11/1994 | Doeringer et al. | 370/60 |
| 5,424,724 | 6/1995 | Williams et al. | 340/825.05 |
| 5,444,851 | 8/1995 | Woest | 395/200.1 |
| 5,459,719 | 10/1995 | Hayashi | 370/58.3 |
| 5,473,608 | 12/1995 | Gagne et al. | 370/85.13 |
| 5,485,455 | 1/1996 | Dobbins et al. | 370/60 |
| 5,612,959 | 3/1997 | Takase et al. | 370/390 |
| 5,666,360 | 9/1997 | Chen et al. | 370/390 |
| 5,684,800 | 11/1997 | Dobbins et al. | 370/401 |
| 5,684,961 | 11/1997 | Cidon et al. | 395/200.15 |

FOREIGN PATENT DOCUMENTS

| | | |
|---|---|---|
| 0306781 | 3/1989 | European Pat. Off. . |
| 2705518 | 11/1994 | France . |

OTHER PUBLICATIONS

"Reliable Multicasting in Wide Area ISDN", *Motorola Technical Development*, 26, p. 120, (Nov. 1995).

*Primary Examiner*—Hassan Kizou
*Attorney, Agent, or Firm*—Schwegman, Lundberg, Woessner & Kluth, P.A.; Anthony Claiborne

[57] ABSTRACT

A polynomial expansion network of a plurality of nodes, each node capable of communicating with the other nodes through a communications system. The network has an originating node that sends a message for ultimate receipt by a subset of nodes in a polynomial expansion manner. The network also has a first and a second receiving node, each of which receives the message from the originating node. The first and second receiving nodes also receive a unique list of other nodes to which the message has not yet been sent. The polynomial expansion manner can be optimized such that each node sends the message to no more than a predetermined number of other nodes to which the message has not yet been sent, or such that, before each node receives the message, the message passes through no more than a predetermined number of other nodes.

22 Claims, 7 Drawing Sheets

MULTICAST MESSAGE DISTRIBUTION IN A POLYNOMIAL EXPANSION MANNER

FIELD OF THE INVENTION

This invention relates generally to the multicast distribution of a message to a plurality of nodes, and more particularly to such multicast distribution in a polynomial expansion manner.

BACKGROUND OF THE INVENTION

Frequently an originating node, typically a computer, needs to broadcast a particular message to a number of other nodes, commonly called receiving nodes. The originating node may be in common connection with the receiving nodes through a dedicated network—for example, a local-area network connecting a number of such nodes physically proximate in an environment such as an office, or a wide-area network connecting a number of nodes separated by great distances from one another. Alternatively, the originating node may only have the capability of connecting with the receiving nodes through a general-purpose communications system—for example, a POTS (plain-old telephone system), or an ISDN (Integrated Services Digital Network).

In either case, the message is typically received by the receiving nodes wherein the originating node directly sends the message to each receiving node. This method has a number of disadvantages. First, the transmittal of the message may result in the originating node incurring substantial cost. For example, if the originating node is located in one country, and there are one-hundred receiving nodes all located in another country, transmittal of the message across a POTS will result in the originating node incurring long-distance charges for one-hundred international calls.

Second, the transmittal of the message may take a long time. For example, if the originating node is sending the message to one-thousand receiving nodes, it may take the originating node a substantial length of time to contact each receiving node and send the message. This means that several receiving nodes may not see the message for quite some time. Moreover, the transmittal of the message may tie up the originating computer such that the node may not be used for any other function while the transmission is occurring.

There is a need, therefore, wherein an originating node can send a message to a plurality of receiving nodes without having to incur substantial connect-time or calling charges to do so. There is also a need for each receiving node to receive the message in the most time-efficient manner that is possible. Finally, there is a need for the originating computer to transmit the message to the other nodes in a manner such that the node is tied up for the least amount of time possible.

SUMMARY OF THE INVENTION

This invention relates to the multicast distribution of messages in a polynomial expansion manner. In a first embodiment of the invention, the originating node sends a message to a limited number of nodes, each node also receiving a unique list of other nodes that should ultimately receive the message. Each of these other nodes then sends the message to one or more nodes on its list, along with a unique sublist of nodes that still have not received the message. This process is repeated until all the nodes have received the message.

In a particular embodiment of the invention, the number of other nodes to which each node sends the message is optimized so that connect-time or calling charges are reduced. Thus, the originating node may send the message to two nodes, each of which sends the message to two other nodes, etc., until every node has received the message. In this way, the invention has the advantage of minimized connect-time or calling charges as compared to the prior art.

In another particular embodiment of the invention, the number of other nodes to which each node sends the message is optimized so that each node receives the message in the quickest time possible. Thus, the message may be passed from the originating through no more than an optimally determined number of intermediary nodes before ultimate receipt by all the nodes. In this way, the invention has the advantage of the nodes receiving the message in a reduced "worst case" amount of time compared to the prior art, wherein the last receiving node to receive the message must wait for the originating node to first send the message to all the other receiving nodes.

In either embodiment, the originating node sends the message to a lesser number of nodes than will ultimately receive the message. In this manner, the invention has the advantage of tying up the originating node for a reduced amount of time while it transmits the message, as compared to the prior art. Other and further aspects and advantages of the present invention will become apparent in the following description and by reference to the accompanying drawings.

DETAILED DESCRIPTION OF THE DRAWINGS

Figure 1:
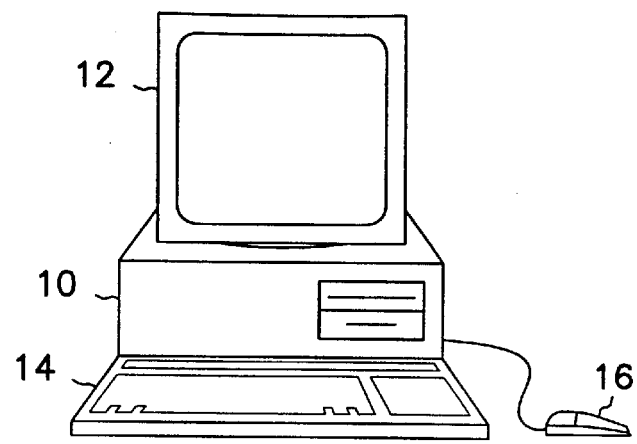
FIG. 1 is a diagram of a computer that is an exemplary node under the present invention.

The present invention contemplates an originating node sending a message for ultimate receipt by a number of receiving nodes in a polynomial expansion manner. The present invention is not limited as to the type of node that engages in such multicast message distribution according to the present invention. However, a typical example of such a node is a computer as shown in FIG. 1. Computer 10 may be of any type, for example, a Gateway 2000, Dell, Compaq or an Apple Macintosh. Computer 10 usually has connected to it monitor 12, keyboard 14, and input device 16, which as shown in FIG. 1 is a mouse. Not shown is that computer 10 typically also comprises a random-access memory (RAM), a read-only memory (ROM), a central-processing unit (CPU), a fixed storage device such as a hard disk drive, and a removable storage device such as a floppy disk drive.

According to the present invention, each node, such as computer 10, is capable of connecting to a communications system. The invention is not limited to a particular type of communications system to which the nodes are connected, however. Typical communications systems include general-purpose systems such as POTS (plain-old telephone systems) and ISDN (Integrated Services Digital Network), as well as special-purpose systems such as a LAN (local-area network) or a WAN (wide-area network). Those skilled in the art will appreciate that the principles of the present invention can be applied to virtually any communications system without departing from the scope of the invention.

Figure 2:
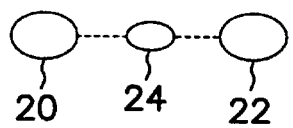
FIG. 2 is a logical diagram of an ISDN channel that is an exemplary channel of a communications system under the present invention.

In one embodiment, the communications system is ISDN. A logical diagram of a typical ISDN cable is shown in FIG. 2. B channels 20 and 22, and D channel 24, make up a logical ISDN line known as a Basic Rate Interface (BRI) line. The workings of ISDN are well known by those skilled in the art, and, therefore, are not within the scope of the present invention. However, as generally used within the art, D channel 24 is a control channel that allows a node to contact another node also connected to the ISDN, while B channels 20 and 22 are data channels through which nodes send data to one another. The D channel typically has a bandwidth of 16,000 bits per second (bps), while the B channels typically have a bandwidth of 64,000 bits per second (bps) each.

So that each node can connect to the communications system, each node typically includes one or more logical connections designed for this purpose. For example, if the communications system to which the invention is adapted is ISDN, each node includes a logical control connection for coupling to a D channel, and at least one logical data connection for coupling to a B channel. The invention is not limited to any particular connection configuration, however, and the design of such connection configurations is well known by those skilled in the art. A controller runs on each node for execution of multicast distribution of a message according to the present invention. For example, if the node is a computer as shown in FIG. 1, the controller will generally be a software program run on the computer, and which controls the interaction of the computer with the communications system according to the present invention.

Figure 3:
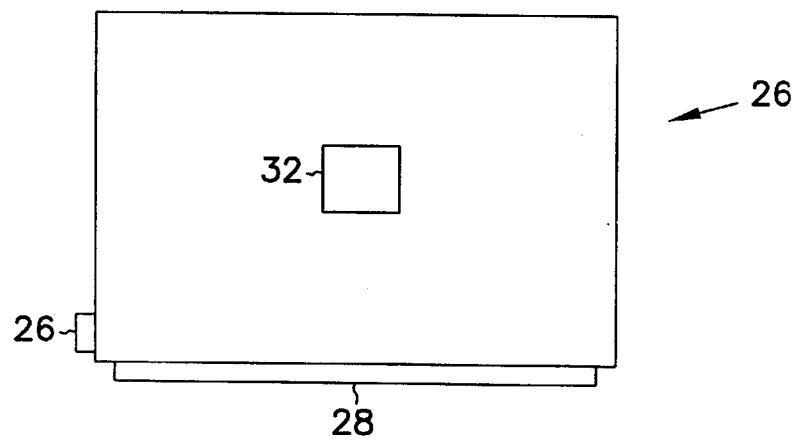
FIG. 3 is a diagram of a network card for connection to a node under the present invention.

Alternatively, a computer can execute the multicast distribution of a message according to the present invention by inclusion of a network card as shown in FIG. 3. Network card 26 includes interface 28 for connecting to the computer. Interface 28 can be a connector capable of coupling to the computer in any of a number of different schemes and protocols, as those skilled in the art can readily appreciate. For example, in one embodiment interface 28 is a connector for coupling to what is known in the art as the PCI bus of a computer. Network card 26 also includes port 30 which enables the computer to connect to a communications system, such as POTS, ISDN, WAN, LAN, etc.

Finally, network card 26 includes data processing logic 32. In one embodiment of the present invention, the controller is a software program that runs on the network card via data processing logic 32, and in this way controls the interaction of the computer to which it is connected with the communications system according to the present invention. In this manner, the present invention allows for any computer having the capability of connecting to interface 28 of network card 26 to become a node capable of multicast message distribution according to the present invention.

In one particular embodiment, the controller executing a particular scheme for distributing a message in a polynomial expansion manner according to the present invention is identical for each node. The controller of a node is, therefore, operable in a mode in which the node acts as an originating node. The controller is also operable in another mode in which the node acts as a receiving node having the capability of potentially passing the message from the originating node to other receiving nodes.

Figure 4:
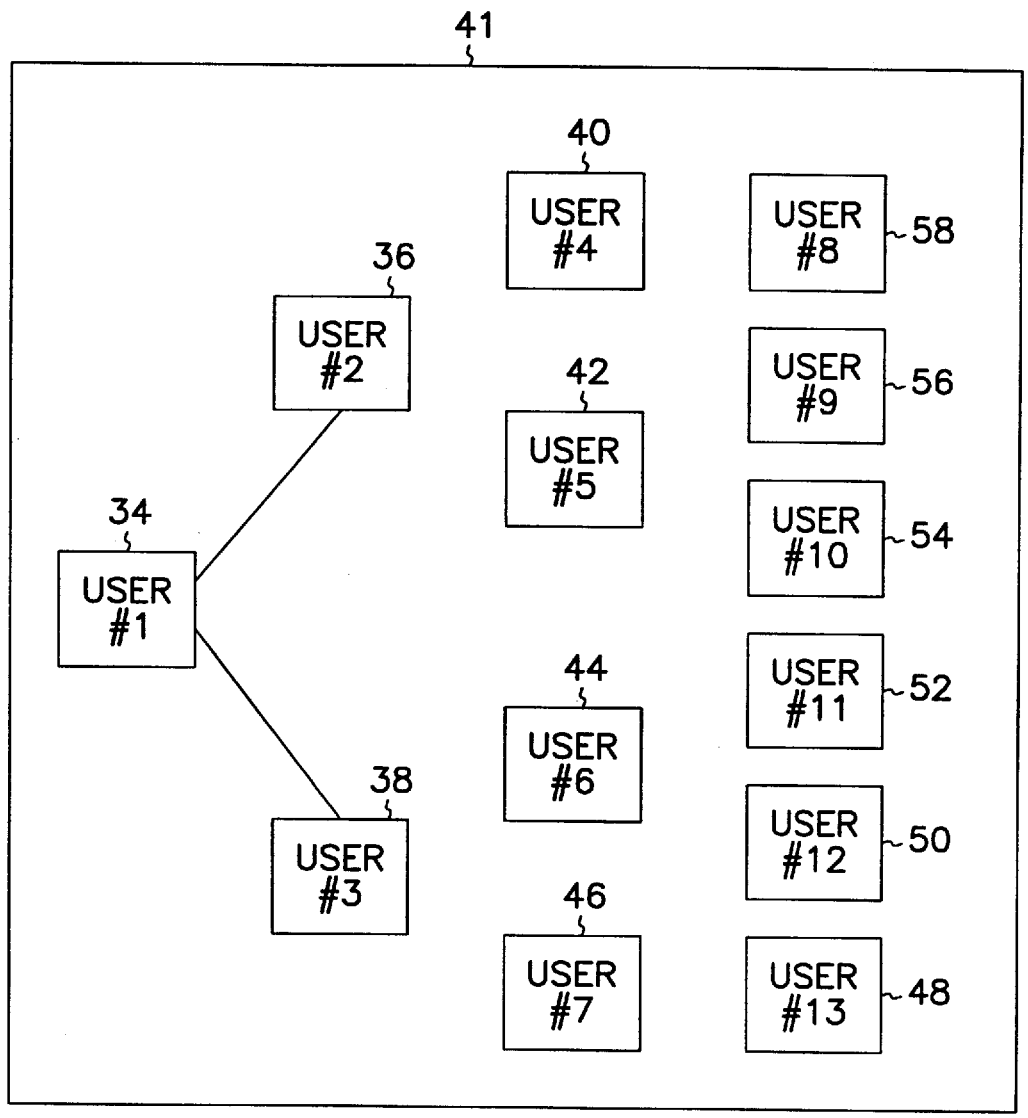
FIGS. 4–6 are block diagrams illustrating the execution of multicast message distribution in a polynomial expansion manner according to the present invention.
Figure 5:
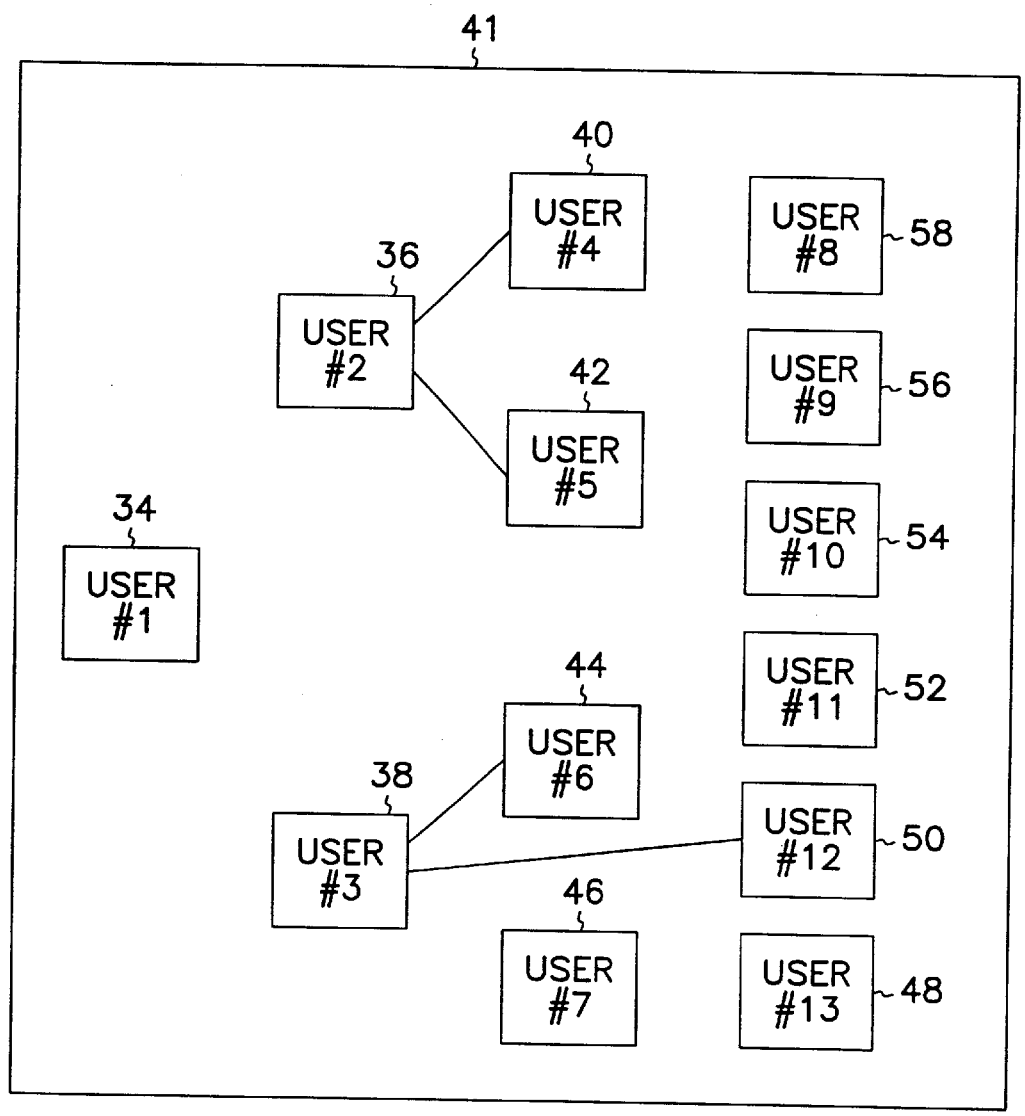
Figure 6:
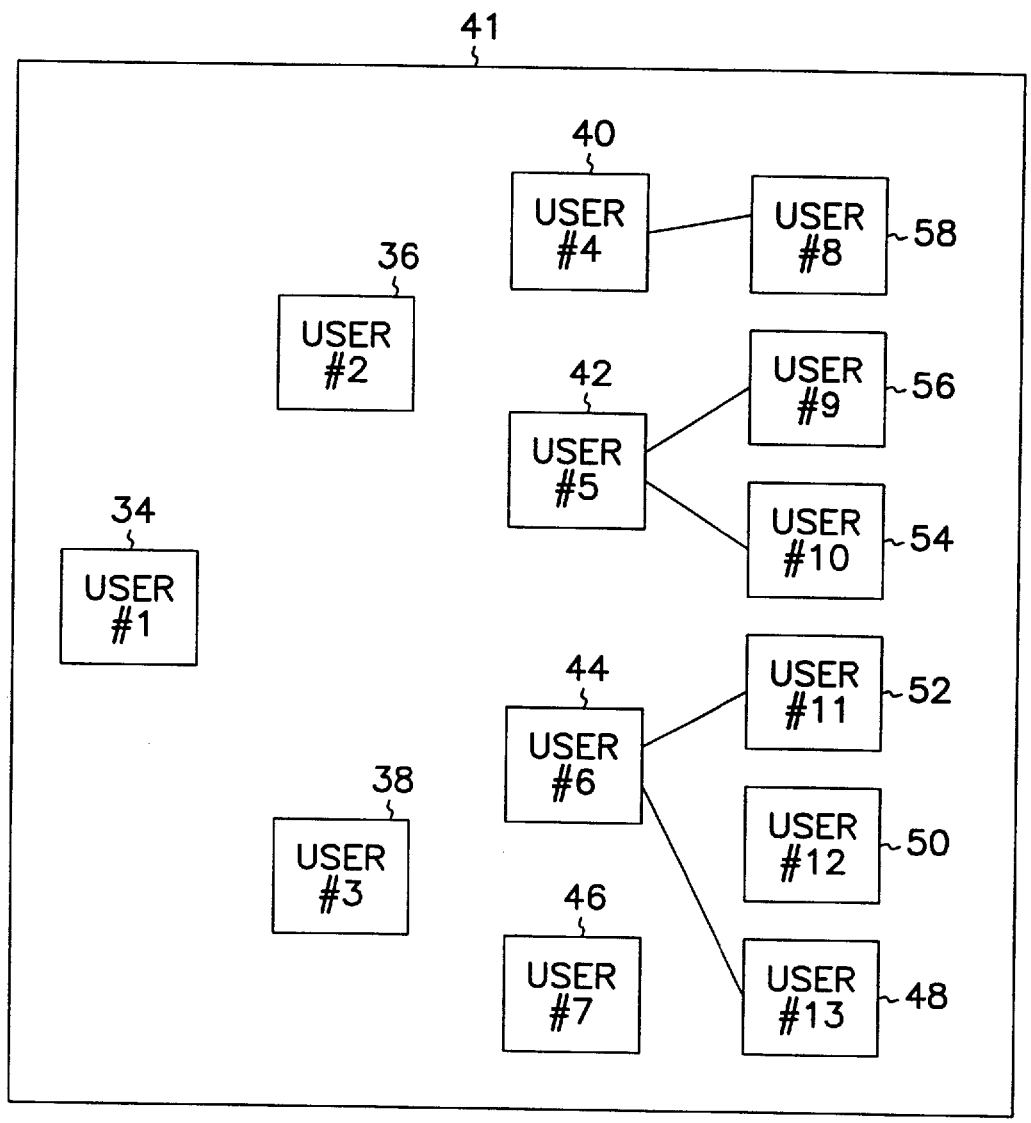

The general process by which an originating node sends a message for ultimate receipt by a number of receiving nodes according to the present invention is shown in conjunction with FIGS. 4, 5 and 6. The present invention is not limited as to the type of message sent. The message could be an electronic mail, a status message, or any other type of message, as those skilled in the art will readily recognize. As shown in FIGS. 4, 5 and 6, node 34 is the originating node, while nodes 36, 38, 40, 42, 44, 46, 48, 50, 52, 54, 56, and 58, are all potential recipient nodes, as shown in FIGS. 4, 5 and 6. Box 41 encompassing all the nodes signifies that the nodes can communicate with one another, by an existing telecommunications system such as a local-area network, an existing telecommunications system, etc. Thus, node 34 is capable of communicating with the other nodes through a communications system, as has already been discussed. For sake of example only, and not meant to limit the invention, the message sent by node 34 is intended for receipt by all nodes except for node 46.

As those skilled in the art will appreciate, the number of nodes shown in FIGS. 4, 5 and 6 is meant by way of example only, and the present invention is not meant to be limited to such number. Any number of nodes that are capable of communicating to one another through a communications system can be used, without departing from the scope of the invention. Furthermore, node 34 is the originating node also by way of example only. As those skilled in the art can appreciate, any node 36, 38, 40, 42, 44, 46, 48, 50, 52, 54, 56, and 58 can serve as the originating node without departing from the scope of the present invention.

According to one embodiment of the present invention, node 34 sends the message to nodes 36 and 38, as shown in FIG. 4. Then, as shown in FIG. 5, node 36 sends the message to nodes 40 and 42, while node 38 sends the message to nodes 44 and 50. Finally, as shown in FIG. 6, node 40 sends the message to node 58; node 42 sends the message to nodes 54 and 56; and node 44 sends the message to nodes 48 and 52. In this manner, each node except for node 46 ultimately receives the message sent by originating node 34.

As displayed in FIGS. 4, 5 and 6, the present invention allows for several advantages over the prior art. First, the message originating at node 34 is ultimately received by eleven other nodes, even though node 34 only had to directly communicate with two other nodes. Thus, any long-distance calling or connect-time charges that node 34 has to incur to communicate with other nodes are reduced from eleven such charges to only two. Likewise, the amount of time that node 34 is tied up communicating with other nodes is reduced, since it has to communicate with nine fewer nodes.

Finally, because each node receives the message from the originating node after it has passed through no more than two other nodes, the "worst case" transmission time to any particular node is greatly reduced. For example, if node 34 had to communicate with nodes 36, 38, 40, 42, 44, 48, 50, 52, 54, 56 and 58 in sequential fashion and in that order, node 58 would not receive the message until node 34 had first sent it to all the other nodes. Assuming that it takes the same amount of time to send a message between any two nodes, and for sake of reference giving such time a delay factor of one, node 58 would not have received the message until a delay factor of ten. This is because node 34 would have first contacted the ten other receiving nodes before it had contacted node 58, each other receiving node delaying the ultimate transmission to node 58 by one delay factor.

Conversely, as shown in FIGS. 4, 5 and 6, node 58 receives the message after only a delay factor of two. That is, in FIG. 4, node 34 sends the message to node 36, incurring one delay factor. In FIG. 5, node 36 sends the message to node 40, incurring another delay factor. Thus, only two delay factors are incurred prior to node 40 sending node 58 the message, as shown in FIG. 6. Multicast distribution of a message under the present invention thus results in a significantly shorter "worst case" delay for each receiving node to receive the message, as compared to the prior art.

Under the present invention, each receiving node knows the other receiving nodes to which it must send the message because along with the message itself the node may also receive a list of nodes that have still not received the message. If a particular receiving node does not receive such a list of nodes, then it does not pass along the message to any other nodes. The present invention is not limited to a particular scheme for constructing such lists. As those skilled in the art can readily recognize, schemes can be constructed for optimization as to almost any purpose, including optimization for shortest delivery time to all the nodes, as well as to the fewest number of calls or connections made by each node. The construction of such a list, and the multicast distribution of a message thereto in accordance with the present invention, is executed by the controller, which is run either on the nodes themselves or on the network cards attached to the nodes.

Figure 7:
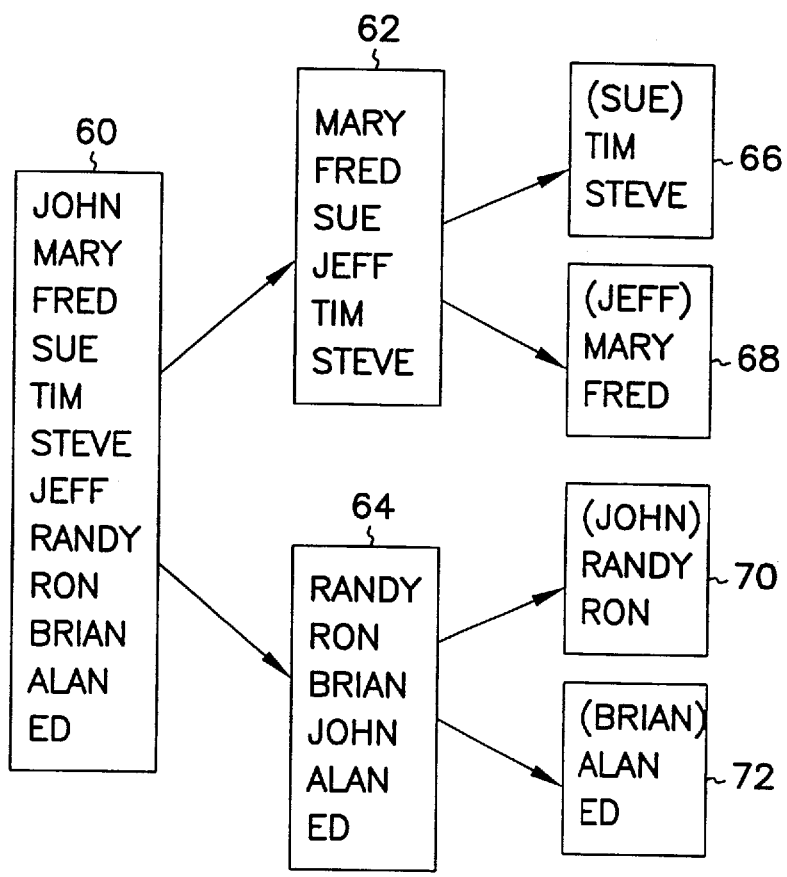
FIG. 7 is a block diagram illustrating the construction of sub-lists to facilitate multicast message distribution in a polynomial expansion manner according to the present invention.

As a further example, the lists shown in FIG. 7 are constructed so as to be optimized for speed. The controller for the originating node constructs list 60, which includes the names of the twelve nodes to be sent the message. As those skilled in the art will appreciate, the list also contains connection information regarding each node, for example, with respect to an ISDN network, the phone number of each node is included in the list. This connection information is necessary to allow the named nodes in the list to be contacted through the communications system.

This list is then split a predetermined number of times. As shown in FIG. 7, the list is split two times, first into two sub-lists each having the same number of nodes, and then into four sub-sub-lists, each also having the same number of nodes. However, the present invention is not limited to having the list split only two times, and is also not limited to each sublist having the same number of nodes. Thus, list 60, which has the names of twelve nodes, is split into sub-lists 62 and 64, each having the names of six nodes. Sublist 62 is then split into sub-sub-lists 66 and 68, each with the names of three nodes; sublist 64 is split into sub-sub-lists 70 and 72, each also with the names of three nodes. In the embodiment of the invention shown in FIG. 7, the first name in each of sub-sub-lists 66, 68, 70 and 72 receives the message from the originating node, along with the list of the other two names on the list, to which the message must also be sent.

Figure 8:
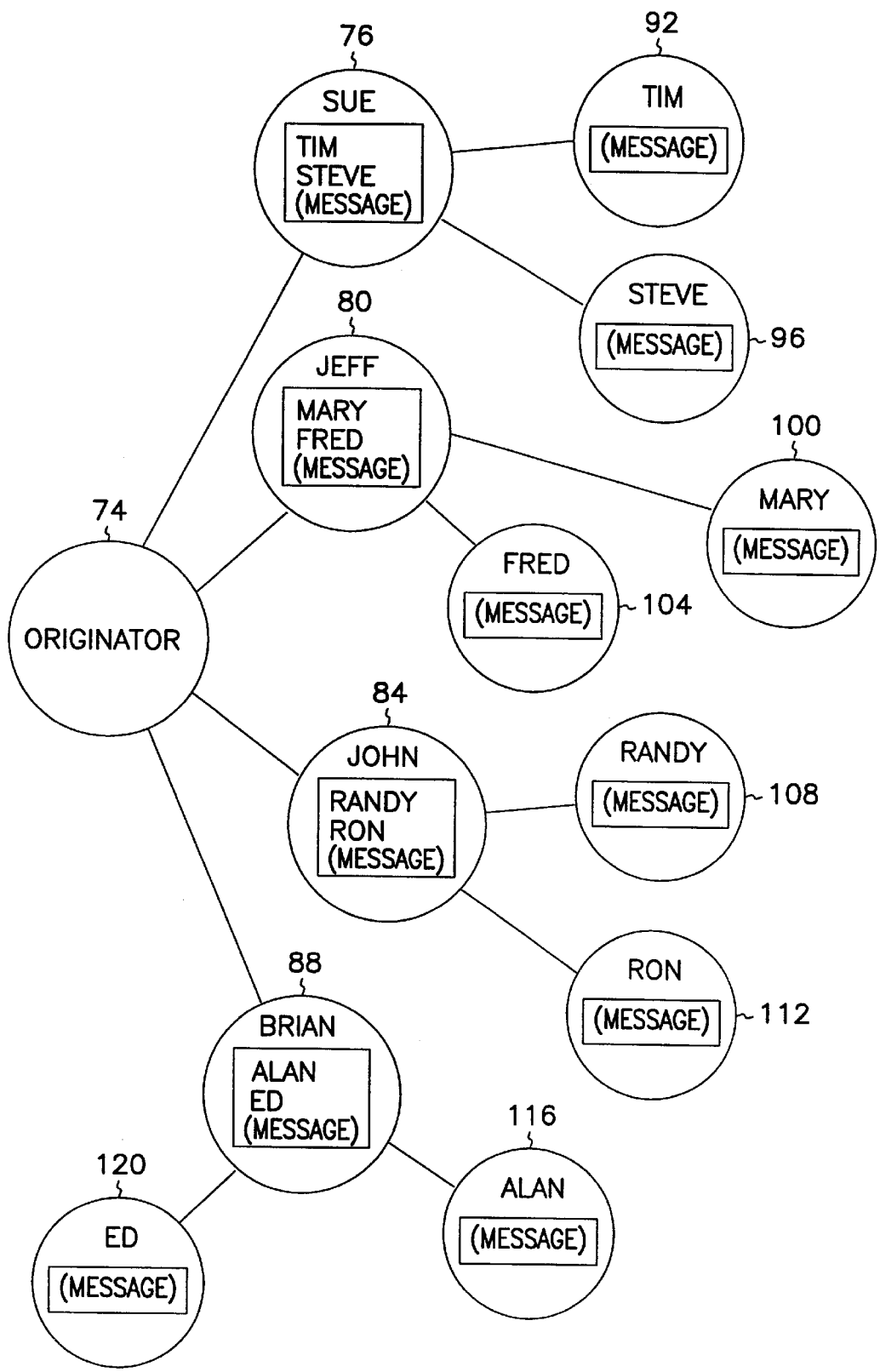
FIG. 8 is a block diagram illustrating the execution of multicast message distribution in a polynomial expansion manner according to the present invention, in accordance with the sub-lists shown in FIG. 7; and, FIG. 9 is a flow chart showing an alternative scheme for constructing sub-lists to facilitate multicast message distribution in a polynomial expansion manner according to the present invention.

The actual execution of multicast distribution of the message from an originating node to the receiving nodes named in sub-sub-lists 66, 68, 70 and 72 will also vary under the present invention, according to the specific communications system chosen. Thus, for example, as shown in FIG. 8, originating node 74 distributes the message to allow the nodes listed in sublist 60 over ISDN. Each node 74, 76, 80, 84, 88, 92, 96, 100, 104, 108, 112, 116 and 120 is capable of communicating over two different ISDN B channels, and is capable of contacting other nodes through a separate ISDN D channel. As those skilled in the art will recognize, the use of two B channels allows each node to simultaneously communicate with two other nodes, once those nodes have individually been contacted via the D channel.

Still referring to FIG. 8, originating node 74 first sends the message to the first node listed on sub-sub-lists 66 and 68 (shown in FIG. 7), along with the remainder of the sub-sublists. In other words, node 74 contacts node 76 via the ISDN D channel and also contacts node 80 via the ISDN D channel. Node 74 then establishes connection with node 76 via one of its B channels, and establishes connection with node 80 via the other of its B channels. Node 74 sends node 76 the message over a B channel, along with sublist 78, which is sub-sublist 66 with the name of node 76 removed. Node 74 concurrently sends node 80 the message over a B channel, along with sublist 82, which is sub-sublist 68 with the name of node 80 removed. This transmission to node 80 is concurrent with the transmission to node 76 because node 74 has two B channels connected to it.

Still referring to FIG. 8, originating node 74 in a likewise manner then sends the message to the first node listed on sub-sub-lists 70 and 72 (shown in FIG. 7), along with the remainder of the sub-sub-lists. Thus, node 74 sends node 84 the message along with sublist 86, which is sub-sublist 70 with the name of node 84 removed. Node 74 concurrently sends node 88 the message along with sublist 90, which is sub-sublist 72 with the name of node 88 removed. Concurrent to node 74 transmitting to nodes 84 and 88, nodes 76 and 80 each send the message to the nodes listed in sub-lists 78 and 82, respectively. Thus, node 76 sends the message to nodes 92 and 96, while node 80 sends the message to nodes 100 and 104. Note that neither node 92, 96, 100 or 104 receives a sublist. Because each of lists 78 and 82 contains only two nodes, and each of nodes 76 and 80 has dual-B channel ISDN capability, nodes 76 and 80 can send the message to all the nodes on their respective lists simultaneously. There are no nodes left to be contacted by nodes 92, 96, 100 or 104.

Finally, in a similar manner nodes 84 and 88 send the message to the nodes on their sub-lists. That is, node 84 sends the message to nodes 108 and 112, because these are the nodes listed on sublist 86. Node 88 concurrently sends the message to nodes 116 and 120, which are listed on sublist 90. Again, as those skilled in the art understand, the present invention is not so limited to the multicast distribution of a message as shown in FIG. 8. The distribution shown in FIG. 8 is but one specific example of an optimization scheme under the present invention; moreover, it is one specific example of an optimization scheme as applied to one specific communications system, ISDN.

The multicast distribution of the message as shown in FIG. 8 is specifically optimized for speed. No node encounters delay of more than the predetermined factor of two before it receives the message. Node 74 first sends the message to nodes 76 and 80, which results in a delay factor of one. Nodes 84 and 88 receive the message from node 74, nodes 92 and 96 receive the message from node 76, and nodes 100 and 104 receive the message from node 80, all simultaneously during the second delay factor. After this second delay factor, the remaining nodes finally receive the message; nodes 108 and 112 from node 84, and nodes 116 and 120 from node 88.

Figure 9:
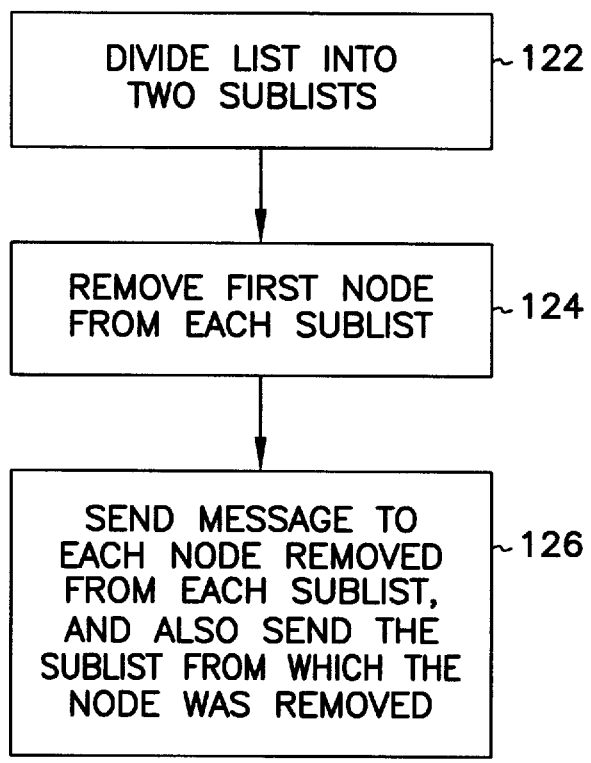

Other optimization schemes can be adopted under the present invention for other purposes. A method for constructing lists and executing multicast distribution of a message such that each node contacts no more than a predetermined two other nodes is shown in FIG. 9. The controller for each node, which is run on either the computer or the network card attached thereto, executes the steps of the method. The optimization scheme shown in FIG. 9 is useful because it limits the calling or connect-time charges incurred by any one particular node, and also because certain communications systems such as ISDN specifically allow for simultaneous connection between a node and only two other nodes.

Referring to FIG. 9, in step 122 the list of nodes to which the originating node wishes to send a message is divided into two sub-lists. If the number of nodes in the list is not even, then one sublist will have one more node than the other. For example, if the originating node wishes to send a message to nodes A, B, C, D and E, one sublist has nodes A, B and C, and the other sublist has nodes D and E. In step 124, the first node in each sublist is removed. Referring back to the example, node A is removed from one sublist, leaving nodes B and C, while node D is removed from the other sublist, leaving node E. Finally, in step 126 the originating node sends the message to each node it had removed from a sublist, along with the remainder of the sublist from which it had removed the node. Thus, node A is sent the message along with the sublist listing nodes B and C, while node D is sent the message along with the sublist listing node E.

Steps 122, 124 and 126 are then repeated, until the sub-lists contain no nodes, corresponding to the condition that each node has received the message. Referring back to the example, node A splits its sublist into two sub-sub-lists in step 122, one sub-sublist having node B and another sub-sublist having node C. In step 124 the first node is removed from each sub-sublist. Thus, node B is removed from the first sub-sublist, leaving no nodes therein, and node C is removed from the second sub-sublist, also leaving no nodes therein. Finally, in step 126, node A sends the message to nodes B and C. Steps 122, 124 and 126 are not repeated with respect to nodes B or C, because the resulting sub-sub-lists are empty.

Similarly, steps 122, 124 and 126 are repeated with respect to node D. In step 122, node D splits its sublist into two sub-sub-lists. However, since there is only one node in node D's sublist (node E) one sub-sublist as a result of step 122 is empty, and the other sub-sublist contains node E. In step 124, the sub-sublist containing node E has node E removed therefrom. Finally, in step 126, node D sends the message to node E. Steps 122, 124 and 126 are not repeated with respect to node E, because the resulting sub-sublist is empty.

In this manner, the method for distributing a multicast message in a polynomial manner according to the present invention is optimized so that each node only sends the message to no more than a predetermined two other nodes. Referring back to the example, the originating node sends the message to two nodes, nodes A and D. Node A sends the message to two nodes as well, nodes B and C. Node D sends the message to one other node, node E. Nodes B, C and E each do not send the message.

Those of ordinary skill in the art will readily appreciate that many changes and modifications to the above drawings and description can be made without departure from the spirit or scope of the following claims. For example, the invention has been shown to utilize either a call-minimization scheme, wherein each node contacts no more than a predetermined two other nodes, or a speed-optimization scheme, wherein each node receives the message in the smallest amount of time possible. However, the invention could utilize other schemes without departing from the scope of the claims, such as a scheme wherein each node only sends the message to the nodes which are physically closest to it. For another example, the invention has been shown to utilize communications systems such as POTS, ISDN, LAN, and POTS. However, the invention could utilize any communications system in which nodes can communicate with one another, without departing from the scope of the following claims.

I claim:

1. A network of a plurality of nodes, each node capable of communicating with the other nodes through a communications system, the network comprising:

an originating node sending a message for eventual receipt by a subset of nodes;

a first receiving node and a second receiving node, each node receiving the message directly from the originating node along with different respective lists of other nodes to which the message has not yet been sent; and a third receiving node and a fourth receiving node, each node receiving the message directly from the first receiving node along with different respective sub-lists of the list of other nodes to which the message has not yet been sent.

2. The network of claim 1, wherein each node communicates with the other nodes via an ISDN line.

3. The network of claim 2, wherein each ISDN line is a Basic Rate Interface (BRI) line.

4. The network of claim 2, wherein each ISDN line comprises two B channels and a D channel.

5. The network of claim 4, wherein each B channel has a data rate of 64,000 bits per second and the D channel has a data rate of 16,000 bits per second.

6. A network of a plurality of nodes, each node capable of communicating with the other nodes through a communications system, the network comprising:

an originating node sending a message for eventual receipt by a subset of nodes;

a first receiving node and a second receiving node, each node receiving the message directly from the originating node along with different respective lists of other nodes to which the message has not yet been sent;

a third receiving node, the node receiving the message directly from the originating node along with a list of other nodes to which the message has not yet been sent; and a fourth receiving node and a fifth receiving node, each node receiving the message directly from the third receiving node along with different respective sub-lists of the list of other nodes to which the message has not yet been sent.

7. A node for a polynomial expansion network of a plurality of nodes utilizing a communications system comprising:

a port for connecting to the communications system; and, a controller operatively coupled to the port for communicating with the other nodes through the communications system, the controller comprising:

means for receiving an originating message for eventual receipt by a subset of nodes in a polynomial expansion manner along with different respective lists of other nodes to which the message has not yet been sent;

means for sending the message to a destination node along with different respective sub-lists of the list of other nodes to which the message has not yet been sent.

8. The network of claim 7, wherein the polynomial expansion manner is optimized such that each node sends the message to no more than a predetermined number of other nodes to which the message has not yet been sent.

9. The network of claim 7, wherein the polynomial expansion manner is optimized such that, before each node receives the message, the message passes through no more than a predetermined number of other nodes.

10. The node of claim 7, wherein the node communicates with the other nodes via an ISDN line connected to the port.

11. The node of claim 10, wherein the ISDN line is a Basic Rate Interface (BRI) line.

12. The node of claim 10, wherein the ISDN line comprises two B channels and a D channel.

13. The node of claim 12, wherein each B channel has a data rate of 64,000 bits per second and the D channel has a rate of 16,000 bits per second.

14. A network adaptor for connecting a node to a polynomial expansion network of a plurality of nodes utilizing a communications system, the network adaptor comprising:

an interface for connecting to the node;

a port for connecting to the communications system; and, a controller operatively coupled to the port for permitting the node to communicate with the other nodes through the communications system, the controller comprising:

means for receiving an originating message for eventual receipt by a subset of nodes in a polynomial expansion manner along with different respective lists of other nodes to which the message has not yet been sent;

means for sending a message to a destination node along with different respective sub-lists of the list of other nodes to which the message has not yet been sent.

15. The network of claim 14, wherein the polynomial expansion manner is optimized such that each node sends the message to no more than a predetermined number of other nodes to which the message has not yet been sent.

16. The network of claim 14, wherein the polynomial expansion manner is optimized such that, before each node receives the message, the message passes through no more than a predetermined number of other nodes.

17. The adaptor of claim 14, wherein the port is an ISDN port receptive to an ISDN line.

18. The adaptor of claim 17, wherein the ISDN port is receptive to a Basic Rate Interface (BRI) ISDN line.

19. The adaptor of claim 17, wherein the ISDN port comprises two logical B channel connections and a logical D channel connection.

20. The adaptor of claim 19, wherein each logical B channel connection is respective to a B channel having a data rate of 64,000 bits per second and the logical D channel connection is respective to a D channel having a data rate of 16,000 bits per second.

21. A method for networking a plurality of nodes, each node capable of communicating with the other nodes through a communications system, the method comprising the steps of:

sending a message by an originating node for eventual receipt by a subset of nodes;

receiving the message at a first receiving node and a second receiving node directly from the originating node along with different respective lists of other nodes to which the message has not yet been sent; and receiving the message at a third receiving node and a fourth receiving node directly from the first receiving node along with different respective sub-lists of the list of other nodes to which the message has not yet been sent.

22. A method for networking a plurality of nodes, each node capable of communicating with the other nodes through a communications system, the method comprising the steps of:

sending a message by an originating node for eventual receipt by a subset of nodes;

receiving the message at a first receiving node and a second receiving node directly from the originating node along with different respective lists of other nodes to which the message has not yet been sent;

receiving the message at a third receiving node directly from the originating node along with a list of other nodes to which the message has not yet been sent; and receiving the message at a fourth receiving node and a fifth receiving node directly from the third receiving node along with different respective sub-lists of the list of other nodes to which the message has not yet been sent.

* * * * *